United States Patent [19]

Merkovsky et al.

[11] Patent Number: 4,717,529
[45] Date of Patent: Jan. 5, 1988

[54] THIMBLE GUIDE ASSEMBLY

[75] Inventors: Daniel Merkovsky, Monroeville; Richard E. Schwirian, Pleasant Hills, both of Pa.

[73] Assignee: Westinghouse Electric Corp., Pittsburgh, Pa.

[21] Appl. No.: 817,703

[22] Filed: Jan. 10, 1986

[51] Int. Cl.[4] ............................................ G21C 17/10
[52] U.S. Cl. ...................................... 376/245; 376/254
[58] Field of Search ............... 376/175, 176, 352, 353, 376/364, 365, 245, 254, 255, 260, 449, 450, 446, 463, 362

[56] References Cited

U.S. PATENT DOCUMENTS

| 3,713,971 | 1/1973 | Van Santen et al. | 376/352 |
| 3,816,245 | 5/1974 | Bevilacqua | 376/282 |
| 3,971,698 | 7/1976 | Wolff et al. | 376/364 |
| 4,198,272 | 4/1980 | Salmon | 376/352 |
| 4,334,554 | 6/1982 | Geiger et al. | 376/352 |
| 4,535,523 | 8/1985 | Leclercq | 376/446 |
| 4,584,168 | 4/1986 | Formanek | 376/352 |

FOREIGN PATENT DOCUMENTS

| 0027984 | 5/1981 | European Pat. Off. | 376/352 |
| 2472249 | 6/1981 | France | 376/352 |
| 2592517 | 7/1987 | France | |
| 2129189 | 5/1984 | United Kingdom | 376/446 |

Primary Examiner—Deborah L. Kyle
Assistant Examiner—Daniel Wasil
Attorney, Agent, or Firm—Daniel C. Abeles

[57] ABSTRACT

A thimble guide assembly for use in a nuclear reactor includes a lower element which can be screwed into a bore in a core plate and an upper element which can be screwed to the lower element. One of the screw-connections is right-handed while the other is left-handed. The length of the upper element is selected so that the exposed portion of a thimble tube, which extends through the thimble guide assembly and into a fuel assembly above it, is relatively modest, thereby minimizing the turbulence to which the thimble tube is exposed. The lower element of the thimble guide assembly is provided with a sleeve portion which extends through the bore in the core plate, and the tip of the upper element terminates in a planar, annular lip. Both elements are provided with surfaces for engagement by wrenches or other tools. The lower element has annular grooves for engagement by a lower spring clip which is welded to the core plate and an upper spring clip which is welded to the upper element.

18 Claims, 7 Drawing Figures

THIMBLE GUIDE ASSEMBLY

BACKGROUND OF THE INVENTION

The present invention relates to a guide for directing a thimble into a fuel assembly in a nuclear power plant, and more particularly to a thimble guide whose length can readily be changed.

A typical pressurized water reactor includes a reactor vessel which contains nuclear fuel, a coolant (water) which is heated by the nuclear fuel, and means for monitoring and controlling the nuclear reaction. The reactor vessel is cylindrical, and is provided with a hemispherical bottom and a hemispherical top which is removable. Hot water is conveyed from and returned to the vessel by a reactor coolant system which includes one or more reactor coolant loops (usually as three or four loops, depending upon the power-generating capacity of the reactor). Each loop includes a pipeline to convey hot water from the reactor vessel to a steam generator, a pipeline to convey the water from the steam generator back to the reactor vessel, and a pump. The steam generator is essentially a heat exchanger which transfers heat from the reactor coolant system to water from a source that is isolated from the reactor coolant system; the resulting steam is conveyed to a turbine to generate electricity. During operation of the reactor, the water within the vessel and the coolant system is maintained at a high pressure to keep it from boiling as it is heated by the nuclear fuel.

Nuclear fuel is supplied to the reactor in the form of a number of fuel assemblies. Each fuel assembly includes a base element called a bottom nozzle and a bundle of fuel rods and tubular guides which are supported on the bottom nozzle. The fuel rods have cylindrical housings which are filled with pellets of fissionable material enriched with U-235. The tubular guides accommodate measuring instruments and movably mounted control rods of neutron-moderating material. A typical fuel assembly for a pressurized water reactor is about 4.1 meters long, about 19.7 centimeters wide, and has a mass of about 585 kg, and a typical four loop reactor might contain 196 such fuel assemblies supported parallel to one another on a core plate within the reactor vessel. After a service life during which the U-235 enrichment of the fuel assemblies is depleted, the reactor is shut down, the pressure within the vessel is relieved, the hemispherical upper cap of the vessel is removed, and the old fuel assemblies are replaced by new ones.

A number of measuring instruments are employed to promote safety and to permit proper control of the nuclear reaction. Among other measurements, a neutron flux map is generated periodically, such as every 28 days, using data gathered by neutron flex detectors which are moved through a number of randomly selected fuel assemblies. To guide the flux detectors during their periodic journeys, closed stainless steel tubes known as flux thimbles extend through the bottom of the reactor vessel and into the fuel assemblies which have been selected as measuring sites. This will be explained in more detail with reference to FIG. 1.

In FIG. 1, a core plate 10 that is 17.5 inches (44.5 cm) thick is horizontally mounted within a reactor vessel having wall 12, the portion of wall 12 which is illustrated being at the hemispherical bottom end cap of the vessel. A number of fuel assemblies, including fuel assembly 14, are supported in an orderly array on plate 10. Fuel assembly 14 includes a bottom nozzle 16 having four legs 18 which are joined to a platform portion 20 with a centrally disposed aperture 22 in it. For purposes of the present application aperture 22 will be deemed to be located in the plane of the lower surface of plateform portion 20. A number of fuel rods 23 are bundled together and supported on platform portion 20. Within this bundle is an instrumentation tube 24 which is aligned with aperture 22 and which extends to the top nozzle (not illustrated) of fuel assembly 14.

A bore 26 having a threaded region 28 extends through core plate 10 in alignment with aperture 22. A conventional thimble guide 30 is provided with a threaded portion and with a recessed wrench-engaging region 32 which permits technicians to screw guide 30 into threaded region 28 of plate 10 during fabrication of the reactor. After guide 30 is attached in this way, welds 34 are added for additional security. Typically guide 30 is 3.38 inches (8.58 cm) high, from the upper surface of plate 10 to the upper lip 35 of guide 30, and there is a gap of 1.37 inches (3.48 cm) between upper lip 35 and aperture 22.

A bore 36 extends through wall 12 of the reactor vessel in alignment with bore 26. A vessel-penetration sleeve 38 having an outer diameter of about 1.5 inches (3.81 cm) extends through bore 36 and is welded at 40 to provide a seal which is resistant to high pressure. A bottom mounted instrumentation column 42 mounted on plate 10 extends between bore 26 and sleeve 38. Column 42 includes a fitting 44 which is attached to plate 10 by bolts 46, an upper pipe element 48 which is joined to fitting 44 by welds 50, and a lower pipe element 52 which is joined coaxially to element 48 at a tie plate (not illustrated). Lower pipe element 52 has an inner diameter of 2 inches (5.08 cm), so that there is a gap between sleeve 38 and element 52.

In a typical four-loop pressurized water reactor (having 196 fuel assemblies 14), 58 of the fuel assemblies 14 would be randomly selected for neutron flux monitoring. Accordingly, in such a reactor it will be apparent that there would be 58 guides 30, each communicating via a respective bore 26 and bottom mounted instrumentation column 42 with a respective vessel-penetration sleeve 38. During fabrication, sleeves 38 would be installed in the reactor vessel wall 12 and guides 30 and bottom mounted instrumentation columns 42 would be installed on core plate 10, the columns 42 being secured to one another by tie plates (not illustrated). Then the core plate 10 and attached structures would be lowered into the vessel, with the sleeves 38 fitting into elements 52. In the resulting structure, the upper ends (not illustrated) of sleeves 38 are spaced apart from the lower ends (not illustrated) of upper pipe elements 48, so that sleeves 38 are not in fluid-tight communication with bottom mounted instrumentation columns 42.

The bore 54 of upper pipe element 48 typically has a diameter of 0.468 inches (1.189 cm) and terminates in a flared region 56. The bore 58 of fitting 44 is typically 0.68 inches (1.73 cm) in diameter and has flared regions at either end. The bore 26 typically has a diameter of 0.75 inches (1.91 cm). The thing to note is that the channel provided by bores 54, 58, and 26 becomes progressively wider from upper pipe element 48, to fitting 44, to bore 26. This construction facilitates manufacture of the reactor and provides guidance for thimble 60 (to be discussed shortly) while avoiding the possibility that it might become stuck in the channel.

Thimble 60 is a long stainless steel tube which begins at a plate (known as a seal table, not illustrated) outside the reactor vessel and which has a closed end (not illustrated) that is normally disposed inside a fuel assembly. Thimble 60 slidably extends through tube 24, guide 30, bore 26, bottom mounted instrumentation column 42, and sleeve 38. A stainless steel guide tube (not illustrated) is welded to the outer end of sleeve 36, and thimble 60 extends within the guide tube to the seal table, which is typically located in a shielded position near the top of the reactor vessel. Since the interior of the reactor vessel is in fluid communication with the interior of sleeve 38, it will be apparent that the guide tube provides a pressure boundary which extends around thimble 60 from wall 12 to the seal table, where a high pressure seal (not illustrated) is provided between the inner wall of the guide tube (not illustrated) and the outer wall of thimble 60. The net result is that thimble 60 provides a low-pressure access channel into the reactor from a shielded position outside of the reactor.

A flux detector (not illustrated), about 2 inches (5 cm) long, is slidably accommodated within thimble 60 and is attached to a flexible push-pull cable (not illustrated) which extends through thimble 60 to flux-mapping equipment (not illustrated) located beyond the seal table (not illustrated). At periodic intervals, typically once every 28 days, the flux detectors are pushed to the tops of thimbles 60 and are then slowly withdrawn through the fuel assemblies 14 as flux measurements are taken at different heights to provide a neutron flux map of the interior of the reactor.

Normally thimbles 60 remain inserted in the instrumentation tubes 24 of the randomly selected fuel assemblies 14 between the periodic flux mapping operations. Thimbles 60 must be withdrawn from fuel assemblies 14, however, at intervals of 12–18 months when the reactor is shut down for refueling and fuel shuttling. During the refueling operation the nuclear reaction is terminated, the pressure within the reactor vessel is relieved, and the guide tubes (not illustrated) are unsealed from the thimbles 60 at the seal table (not illustrated). The thimbles 60 (which are somewhat flexible) are then withdrawn by a distance of about 14 feet (4.27 meters) to free them from the spent fuel assemblies 14, which are thereupon removed via remote control and replaced by fresh fuel assemblies 14. Thimbles 60 are then driven into the fresh fuel assemblies 14, the reactor vessel and seal table are sealed, and power generation begins anew.

The conventional thimble guide 30 of FIG. 1 has several shortcomings. It has been found that considerable turbulence exists during operation of a reactor in the region between the upper surface of core plate 10 and the lower surfaces of platform portions 20 of fuel assemblies 14. Guides 30 expose a significant portion of thimbles 60 to this turbulence, which vibrates thimbles 60 and increases wear to an undesirable extent. Simply increasing the length of guides 30 would be undesirable because fuel assembly designs may change, including the lengths of legs 18. Since guides 30 are permanently installed at the time the reactor is built, any particular length for guides 30 that is selected at that time might make it impossible to take advantage of future design improvements in fuel assemblies. Furthermore, it has been found that fluid flow in the gaps around thimbles 60 due to the progressively widening channels from elements 48 to fittings 44 to bores 26 is sufficient to cause vibrations which increase wear. Finally, the flared regions at upper lips 35 appear to increase turbulence.

SUMMARY OF THE INVENTION

Accordingly, an object of the present invention is to provide the thimble guide assembly having a length which can be varied in order to reduce the exposed length of the thimble.

Another object of the present invention is to provide a thimble assembly whose length can be adjusted, by remote control, after initial fabrication of the reactor.

Another object of the present invention is to provide a thimble assembly having a lower sleeve to improve the flow path through the bore in the core plate and through the bottom mounted instrumentation column attached to the core plate.

Another object of the present invention is to provide a thimble assembly having an upper lip which is configured to minimize the effects of fluid discharge.

These and other objects are attained by providing a thimble guide assembly which includes an elongated first element having a thimble channel and means for mounting the first element on the core plate so that the thimble channel is coaxial with the bore of the core plate, and an elongated second element having a thimble channel and means for connecting the first element to the second element so that the thimble channels thereof are coaxial.

DESCRIPTION OF THE PREFERRED EMBODIMENTS

Figure 1:
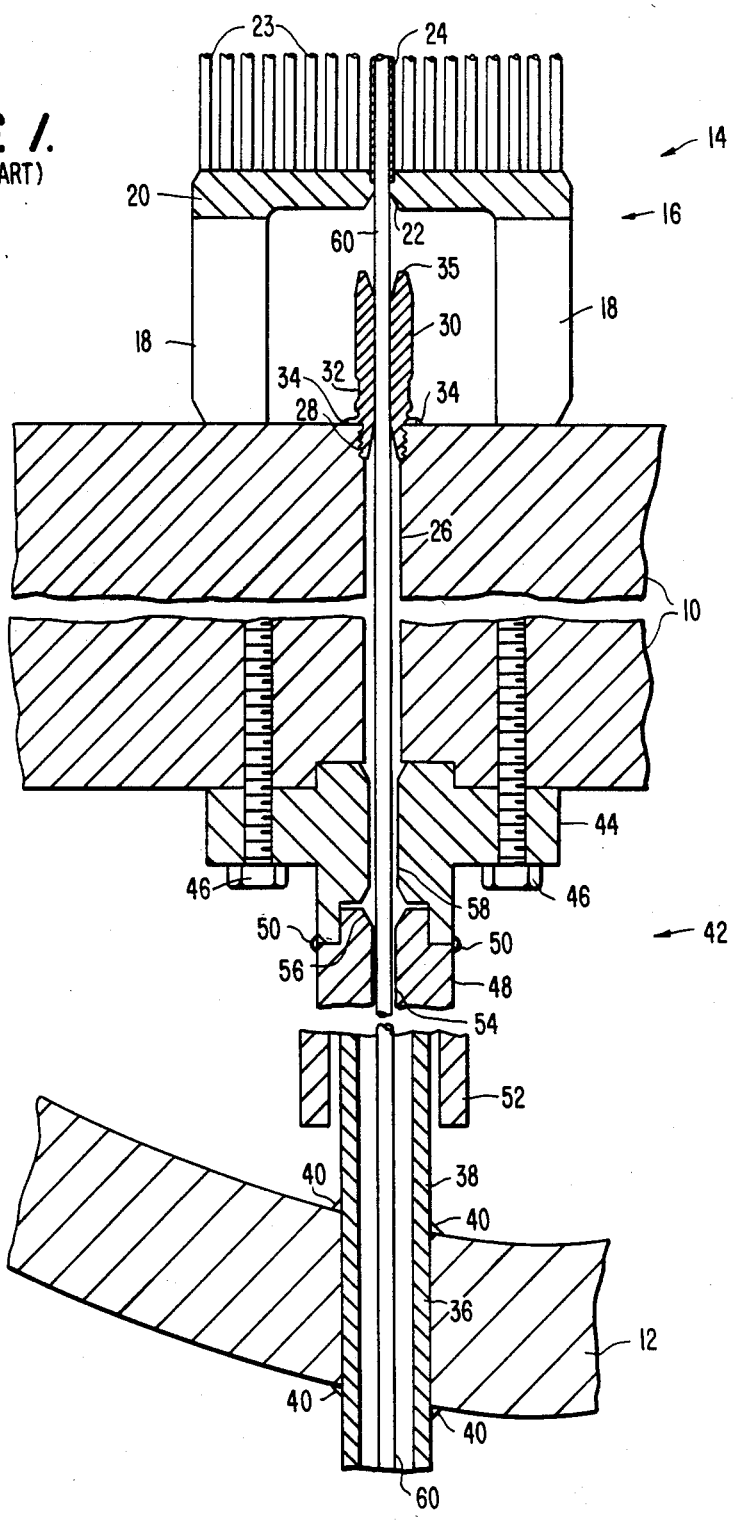
FIG. 1 is a sectional view, partially broken away, generally illustrating a nuclear fuel assembly positioned on a reactor core plate to which a bottom mounted instrumentation column is attached, a conventional thimble guide being mounted on the core plate.
Figure 2:
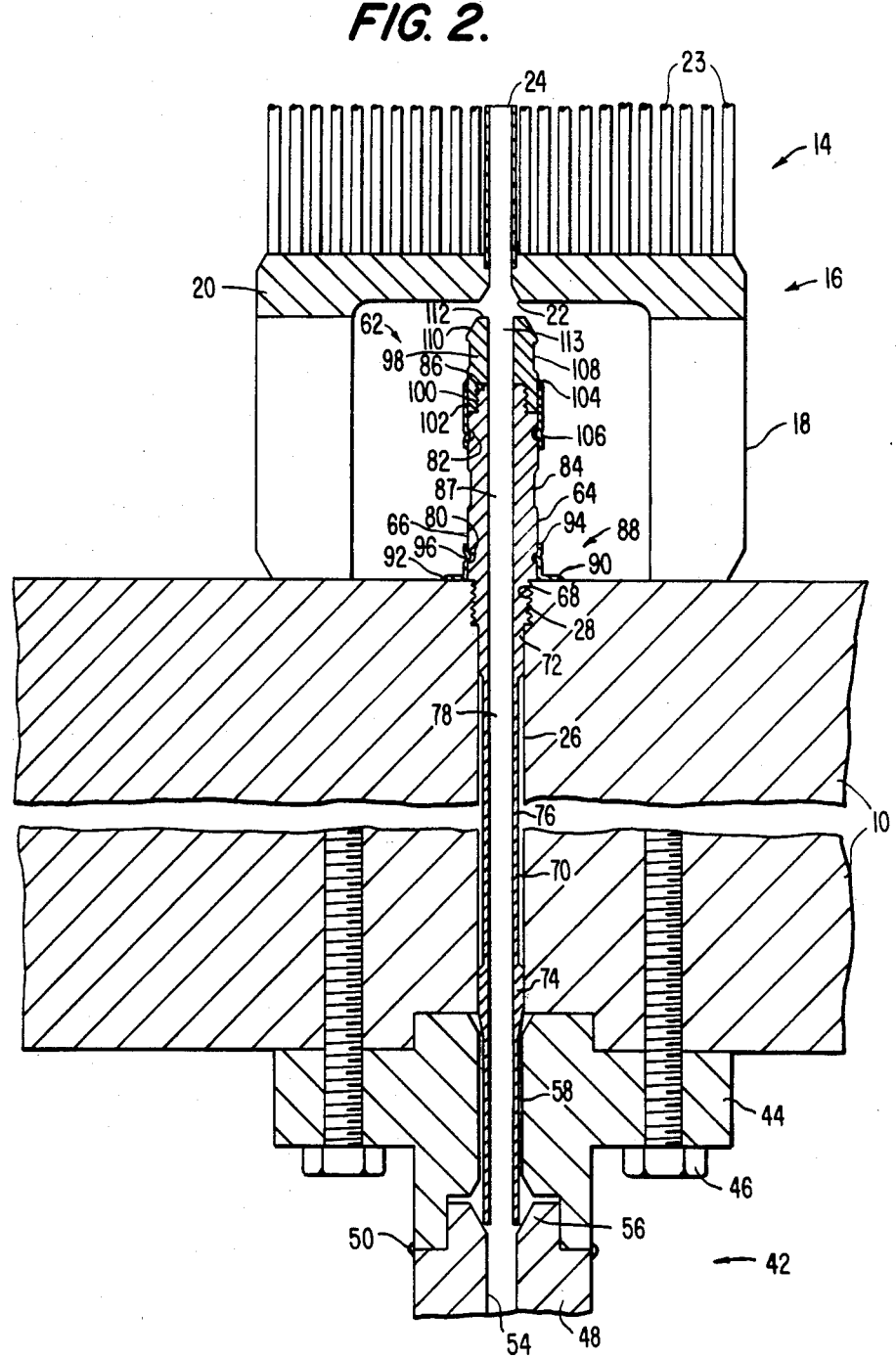
FIG. 2 is a sectional view, partially broken away, illustrating the thimble assembly of the present invention.

In FIG. 2, wherein fuel assembly 14, core plate 10, and bottom mounted instrumentation column 42 are configured as previously discussed with respect to FIG. 1, thimble guide 30 of FIG. 1 has been replaced by thimble guide assembly 62 of the present invention. The first or lower element 64 of assembly 62 includes a projecting portion 66 which extends from the upper surface of core plate 10, a right-hand threaded portion 68 whereby element 64 can be screwed into the threaded region 28 of bore 26, and a lower sleeve portion 70 which extends from threaded portion 68 to the flared region 56 of upper element 48. Sleeve portion 70 is provided with an upper annular shoulder 72 which frictionally engages bore 26 and a lower annular shoulder 74 which also frictionally engages bore 26, the region 76 between shoulders 72 and 74 being spaced apart from bore 26. Sleeve portion 70 provides a uniformly dimensioned flow path 78 between upper pipe element 48 and projecting portion 66 despite the different dimensions of bores 54, 58, and 26, as previously discussed. The uniformity of flow path 78 reduces flow-induced vibration and thus wear of thimble 60 (which is not illustrated in FIG. 2). Region 76 is spaced apart from bore 26 in order to keep the insertion force for lower element 64, during installation thereof, at a modest level.

Figure 3:
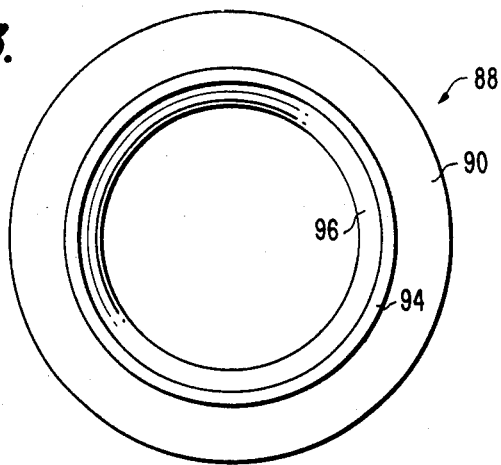
FIG. 3 is a top plan view of the lower spring clip illustrated in FIG. 2.

With continuing reference to FIG. 2, projecting portion 66 is provided with lower and upper annular recesses 80 and 82, a recessed wrench-engaging region 84 and a left-hand threaded sleeve 86. Thimble channel 87 runs through portion 66 to accommodate thimble 60 (see FIG. 1). Lower spring clip 88 (also see FIG. 3) includes a flange portion 90 which is spot-welded at 92 to core plate 10 and a sleeve portion 94 having an annular protrusion 96 which snaps into recess 80.

Figure 6:
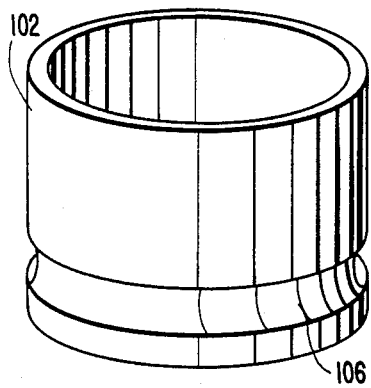
FIG. 6 is a perspective view of the upper spring clip of FIG. 2.

The second or upper element 98 of assembly 62 has a threaded region 100 which screws onto threaded sleeve 86 of lower element 64. Upper spring clip 102 (also see FIG. 6) is spot-welded at 104 to element 98, and is provided with an annular protrusion 106 which snaps into annular recess 82 of lower element 64. Above recessed wrench-engaging region 108, element 98 is terminated by sloping shoulders 110 and flat annular lip 112. The plane of lip 112 is perpendicular to the axis of the cylindrical thimble channel 113 through assembly 62. The squared-off configuration at the top of element 98, in contrast to the sloping recess at upper lip 35 of thimble guide 30 in FIG. 1, minimizes the turbulence created by fluid discharge.

During fabrication of a reactor, an upper element 98 of the desired length is screwed onto a lower element 64, and the elements are tightened together by wrenches inserted into regions 84 and 108. Spring clips 88 and 102 are then forced onto elements 64 and 98 until annular protrusions 96 and 106 snap into place, whereupon welds 104 are applied to form a completed assembly 62. To install the assembly 62 when a reactor is being fabricated, the lower sleeve portion 70 is forced into a bore 26 of the core plate 10 until threaded portion 68 engages threaded portion 28. Assembly 62 is then tightened by a wrench inserted into region 84, and welds 92 are applied.

It will be apparent from FIG. 2 that the distance between the upper tip of guide assembly 62 (that is, lip 112) and aperture 22 is considerably less than the distance between the upper tip of thimble guide 30 (that is, lip 35) in FIG. 1 and aperture 22, so that assembly 62 is more effective in shielding the thimble 60 from turbulence. The distance between lip 112 and aperture 22 is preferably less than about an inch (2.54 cm), and may be 0.5 inches (1.27 cm) or, better still, 0.25 inches (0.64 cm). The fact that assembly 62 is fabricated using a lower element 64 and an upper element 98 means that different fuel assembly designs can be accommodated, during construction of a reactor, simply by selecting an upper element 98 of the appropriate length. More importantly, upper elements 98 can subsequently be exchanged in the event that the lengths of legs 18 change as a result of fuel assembly after a reactor has been made. After removal of the fuel assemblies 14 during a refueling operation, remotely controlled tools can be inserted into the reactor vessel to engage regions 108 and unscrew upper elements 98 so that new elements 98 can be installed, again by remote control. The fact that there is a right-hand threaded connection between plate 10 and lower element 64, and a left-hand threaded connection between element 64 and upper element 98, precludes the possibility that both elements might be unscrewed from core plate 10 simultaneously. That is, unscrewing element 98 tends to screw element 64 in more tightly.

Figure 4:
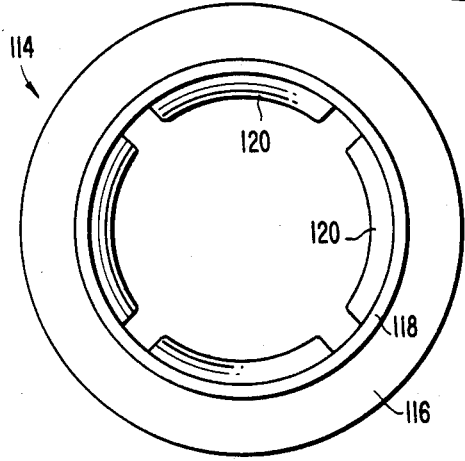
FIG. 4 is a top plan view of a modified lower spring clip.
Figure 5:
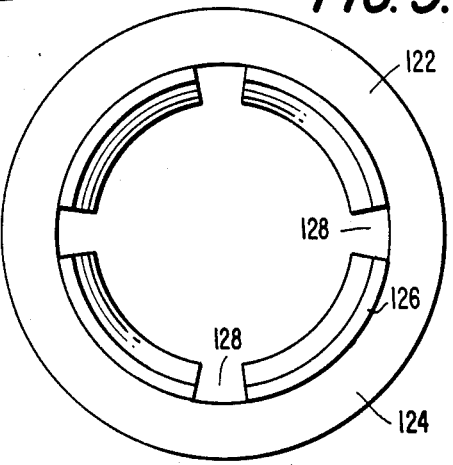
FIG. 5 is a top plan view of another modified lower spring clip.

Spring clips 88 and 102 are present to prevent elements 64 and 98 from becoming unscrewed inadvertently during operation of the reactor due to vibration. The use of spring clips 88 and 102 is preferred but is not essential. Spring clip 102 may have a slot through it to facilitate installation and, similarly, spring clip 88 may have a slot through flange 90 and sleeve portion 94. Other alternatives for spring clip 88 are illustrated in FIGS. 4 and 5. In FIG. 4, lower spring clip 114 has a flange portion 116 and a sleeve portion 118 having a plurality of protrusions 120 rather than the single annular protrusion 96 illustrated in FIG. 3. In FIG. 5, lower spring clip 122 has a flange portion 124 and a sleeve portion 126 having slots 128 which divides it into a plurality of portions.

Figure 7:
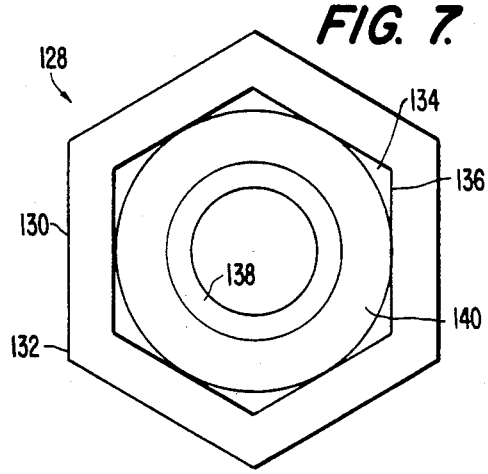
FIG. 7 is a top plan view of another embodiment of the thimble guide of FIG. 2.

While assembly 62 in FIG. 2 employs recessed wrench-engaging regions 84 and 108, other means may be provided to tighten the upper and lower elements. For example in FIG. 7, thimble guide assembly 128 includes a first or lower element 130 having a protruding wrench-engaging region 132, and an upper element 134 having a protruding wrench-engaging region below planar annular lip 138 and sloping shoulders 140. Wrench-engaging regions 132 and 136, which protrude by different distances, facilitate the use of remote-control machinery if upper element 134 is to be replaced after the reactor has been in use. It will be apparent that other alternatives to the FIG. 2 embodiment, including tool-engaging radial or axial slots in the outer surfaces of the upper and lower elements, or a multisided cavity at the opening of the upper element to accommodate an allen-wrench type tool, could be used instead.

It will be understood that the above description of the present invention is susceptible to various modifications, changes, and adaptations, and the same are intended to be comprehended within the meaning and range of equivalents of the appended claims.

What is claimed is:

1. In a nuclear reactor having a reactor core plate with a bore and having an elongated hollow thimble which is longitudinally movable through the bore in the reactor core plate and into a fuel assembly supported by the core plate, the bore having an axis and the fuel assembly having a bottom nozzle with an aperture to receive the thimble, the bottom nozzle having legs which rest on the core plate around the bore and the aperture in the bottom nozzle being spaced apart from the core plate and being positioned along the axis of the bore therein, a thimble guide assembly comprising:
   an elongated first element having an axis, a top end, and a thimble channel which extends along the axis of the first element to the top end thereof, the first element additionally having means for mounting the first element to the core plate so that the bore of the core plate and the thimble channel of the first element are coaxial and so that the top end of the first element is positioned above the core plate; and
   a second element having a top end, a bottom end, an axis running through the top and bottom ends of the second element, and a thimble channel along the axis of the second element, the second element additionally having means at its bottom end for connecting the second element to the top end of the first element so that the thimble channels of the first and second elements are coaxial, the top end of the second element being spaced apart from the nozzle when the first and second elements are connected, wherein the thimble is longitudinally movable through the first and second elements along the thimble channels thereof.

2. The thimble guide assembly of claim 1, wherein the second element has a length that is selected so that the top end of the second element is less than about an inch (2.54 cm) below the aperture in the bottom nozzle.

3. The thimble guide assembly of claim 2, wherein the second element has a length that is selected so that the top end of the second element is less than about half an inch (1.27 cm) below the aperture in the bottom nozzle.

4. The thimble guide assembly of claim 3, wherein the second element has a length that is selected so that the top end of the second element is about a quarter inch below (0.64 cm) the aperture in the bottom nozzle.

5. The thimble guide assembly of claim 1, wherein the bore in the core plate has a region that is threaded, and wherein the means for mounting the first element to the core plate comprises a first portion of said first element having threads to engage the threaded region of the core plate.

6. The thimble guide assembly of claim 5, wherein the first element additionally has, at the top end thereof, a second portion with threads, and wherein the means for connecting the second element to the first element comprises a threaded region at the bottom end of the second element to engage the threads of the second portion of the first element.

7. The thimble guide assembly of claim 6, wherein the threads of the first portion of the first element are right-handed and the threads of the second portion of the first element are left-handed.

8. The thimble guide assembly of claim 6, wherein the threads of the first portion of the first element are left-handed and the threads of the second portion of the first element are right-handed.

9. The thimble guide assembly of claim 6, wherein each of said first and second elements have surfaces that are configured to provide tool-engaging regions so that the elements can be rotated with tools.

10. The thimble guide assembly of claim 9, wherein the tool-engaging regions are recessed wrench-engaging regions.

11. The thimble guide assembly of claim 9, wherein the tool-engaging regions are protruding wrench-engaging regions.

12. The thimble guide assembly of claim 1, wherein the first element additionally comprises a lower sleeve portion which extends into the bore of the core plate, the lower sleeve portion having an outer wall.

13. The thimble guide assembly of claim 12, wherein the outer wall of the lower sleeve portion has at least one protruding shoulder which contacts the core plate, the outer wall of the lower sleeve portion being spaced apart from the core plate except at the at least one protruding shoulder.

14. The thimble guide assembly of claim 13, wherein the bore of the core plate communicates with a bottom mounted instrumentation column that is affixed to the core plate, and the lower sleeve portion extends into the bottom mounted instrumentation column.

15. The thimble guide assembly of claim 1, wherein the first element has an upper annular groove, and further comprising upper spring clip means affixed to the second element for engaging the upper annular groove.

16. The thimble guide assembly of claim 15, wherein the first element additionally has a lower annular groove, and further comprising lower spring clip means affixed to the core plate for engaging the lower annular groove.

17. The thimble guide assembly of claim 1, wherein the thimble channel of the second element is cylindrical and the top of the second element comprises a flat annular lip that extends radially from the periphery of the cylinder.

18. In combination with a nuclear reactor having a core plate with a bore, a thimble guide assembly for accommodating an elongated hollow thimble which is longitudinally movable through the bore in the core plate and into a fuel assembly supported by the core plate, the bore having an axis and the fuel assembly having a bottom nozzle with an aperture to receive the thimble, the bottom nozzle having legs which rest on the core plate around the bore and the aperture in the bottom nozzle being spaced apart from the core plate and being positioned along the axis of the bore therein, comprising:

an elongated first element having an axis, a top end, and a thimble channel which extends along the axis of the first element to the top end thereof, the first element additionally having means for mounting the first element to the core plate so that the bore of the core plate and the thimble channel of the first element are coaxial and so that the top end of the first element is positioned above the core plate; and a second element having a top end, a bottom end, an axis running through the top and bottom ends of the second element, and a thimble channel along the axis of the second element, the second element additionally having means at its bottom end for connecting the second element to the top end of the first element so that the thimble channels of the first and second elements are coaxial, the top end of the second element being spaced apart from the nozzle when the first and second elements are connected, wherein the thimble is longitudinally movable through the first and second elements along the thimble channels thereof.

* * * * *